(12) United States Patent
Johnson et al.

(10) Patent No.: US 7,835,108 B2
(45) Date of Patent: Nov. 16, 2010

(54) DATA STORAGE TAPE RECERTIFICATION

(75) Inventors: Douglas W. Johnson, Stillwater, MN (US); Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 670 days.

(21) Appl. No.: 11/824,338

(22) Filed: Jun. 28, 2007

(65) Prior Publication Data

US 2009/0002859 A1 Jan. 1, 2009

(51) Int. Cl.
G11B 5/584 (2006.01)
(52) U.S. Cl. .................. 360/77.12; 360/48; 360/53; 360/78.02
(58) Field of Classification Search .............. 360/77.12, 360/78.02, 78.03
See application file for complete search history.

(56) References Cited

U.S. PATENT DOCUMENTS

| | | | |
|---|---|---|---|
| 4,771,346 A * | 9/1988 | Shoji et al. ................. 360/15 |
| 5,229,895 A | 7/1993 | Schwarz et al. | |
| 5,394,277 A | 2/1995 | Pahr et al. | |
| 5,394,278 A * | 2/1995 | Pahr et al. ................. 360/66 |
| 5,521,774 A | 5/1996 | Parks et al. | |
| 5,621,583 A | 4/1997 | Parks et al. | |
| 5,629,813 A * | 5/1997 | Baca et al. ............... 360/77.12 |
| 5,739,975 A | 4/1998 | Parks et al. | |
| 6,385,557 B1 * | 5/2002 | Mundo et al. ............. 702/179 |
| 6,906,881 B2 * | 6/2005 | Chliwnyj et al. ............ 360/66 |
| 7,110,211 B2 * | 9/2006 | Sueki et al. ............. 360/77.12 |
| RE39,568 E | 4/2007 | Kaaden et al. | |
| 7,672,076 B2 * | 3/2010 | Nakao et al. ............ 360/77.12 |
| 2005/0047008 A1 * | 3/2005 | Tateishi ...................... 360/121 |
| 2005/0122620 A1 * | 6/2005 | Suda ........................ 360/125 |
| 2006/0126207 A1 * | 6/2006 | Johnson et al. ................ 360/48 |
| 2007/0047122 A1 * | 3/2007 | Czarnecki et al. ............. 360/55 |
| 2007/0109681 A1 * | 5/2007 | Biskeborn et al. .......... 360/121 |

* cited by examiner

Primary Examiner—Dismery E Mercedes
(74) Attorney, Agent, or Firm—Shumaker & Sieffert, P.A.

(57) ABSTRACT

The invention is directed to techniques for erasing data storage tape for reuse. In an embodiment, an erase head module for erasing data storage tape comprises a set of erase gaps and one or more servo read elements. The set of erase gaps is configured to coincide with data bands of the data storage tape to allow erasure of only the data bands of the data storage tape while not erasing servo bands of the data storage tape. The one or more servo read elements detect one of the servo bands of the data storage tape when the set of erase gaps are proximate the data bands of the data storage tape to allow the erase head module to accurately track the data bands with the set of erase gaps.

20 Claims, 4 Drawing Sheets

DATA STORAGE TAPE RECERTIFICATION

TECHNICAL FIELD

The invention relates to data storage media such as magnetic tape.

BACKGROUND

Data storage media commonly used for storage and retrieval of data come in many forms, such as magnetic tape, magnetic disks, optical tape, optical disks, holographic disks or cards, solid state memory such as flash memory and the like. In magnetic media, data is typically stored as magnetization patterns that are magnetically recorded on the medium surface. The data stored on the medium is typically organized along "data tracks," and transducer heads are positioned relative to the data tracks to read or write data on the tracks. A typical magnetic storage medium, such as magnetic tape, usually includes several data tracks, which may be grouped together in multiple data bands. Optical media, holographic media, and other media formats can also make use of data tracks.

Servo patterns refer to patterns or other recorded marks on the medium that are used for tracking purposes. In other words, servo patterns are recorded on the medium to provide reference points relative to the data tracks. A servo head detects a servo pattern and sends a signal representing the detected pattern to a servo controller. The servo controller interprets a detected servo pattern and generates a position error signal (PES). The PES is used to adjust the lateral distance of the transducer head relative to the data tracks so that the transducer head is properly positioned along the data tracks for effective reading and/or writing of data to the data tracks.

With some data storage media, such as magnetic tape, the servo patterns are recorded in specialized areas on the medium, called "servo bands." Servo bands serve as references for the servo controller. Some magnetic media include a plurality of servo bands, with data tracks being located between the servo bands.

The servo patterns recorded in the servo bands may be sensed by one or more servo heads. Once the servo head locates a particular servo band, one or more data tracks can be located on the medium according to the data track's known displacement from the servo band. The servo controller receives signals derived from detected servo patterns from the servo heads and generates PESs, which are used to position a read/write head accurately relative to the data tracks.

SUMMARY

In general, the invention provides techniques for erasing data tracks while preserving servo bands to allow reuse of data storage tape. Embodiments include an erase head module including erase gaps that define a geometry that corresponds to the physical locations of data bands on a data storage media, such as a magnetic data storage tape. As referred to herein, a data band includes one or more data tracks immediately adjacent each other. The erase head module includes a servo read element to track the position of the erase gaps relative to the data storage media and an actuator to precisely position the erase gaps relative to the data storage media. In this manner, the erase head module can maintain the exact location of the erase gaps relative to the data storage media to ensure erasure of the data bands while avoiding erasure of the servo bands.

While magnetic tapes may be reused without erasure, it may be preferable to prevent unwanted access of sensitive data stored on the data storage tape. Erasure of only data bands instead of data bands and servo bands allows an erased tape to be reused.

Embodiments of the invention also allow for verification of the quality of the servo band(s) on a data storage tape simultaneously with erasure of the data storage tape. For example, if a tracking signal quality derived from the servo band(s) is poor, a user may be informed that a data storage tape is not suitable for reuse. For example, a poor signal quality derived from the servo band may occur if a servo pattern is magnetically degraded or, more commonly, if the magnetic tape includes physical imperfections, such as gouges or chips in the edges of the magnetic tape.

In one embodiment, the invention is directed to an erase head module for erasing data storage tape. The erase head module for erasing data storage tape comprises a set of erase gaps and one or more servo read elements. The set of erase gaps is configured to coincide with data bands of the data storage tape to allow erasure of only the data bands of the data storage tape while not erasing servo bands of the data storage tape. The one or more servo read elements detect one of the servo bands of the data storage tape when the set of erase gaps are proximate the data bands of the data storage tape to allow the erase head module to accurately track the data bands with the set of erase gaps.

In another embodiment, the invention is directed to a method of erasing a data storage tape including one or more data bands. The method comprises positioning an erase head module adjacent the data storage tape, detecting a series of servo patterns in a servo band of the data storage tape, maintaining the position of the erase head module relative to the data storage tape with an actuator according to a signal derived from the detected series of servo patterns, and erasing data bands of the data storage tape with the erase head module while not erasing servo bands of the data storage tape.

In another embodiment, the invention is directed to a system for re-certifying used data storage tape cartridges. The system comprises a means for erasing data bands of data storage tapes in the used data storage tape cartridges without erasing servo bands of the data storage tapes and a means for certifying the data storage tapes for reuse according to a signal quality of one or more of the servo bands.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
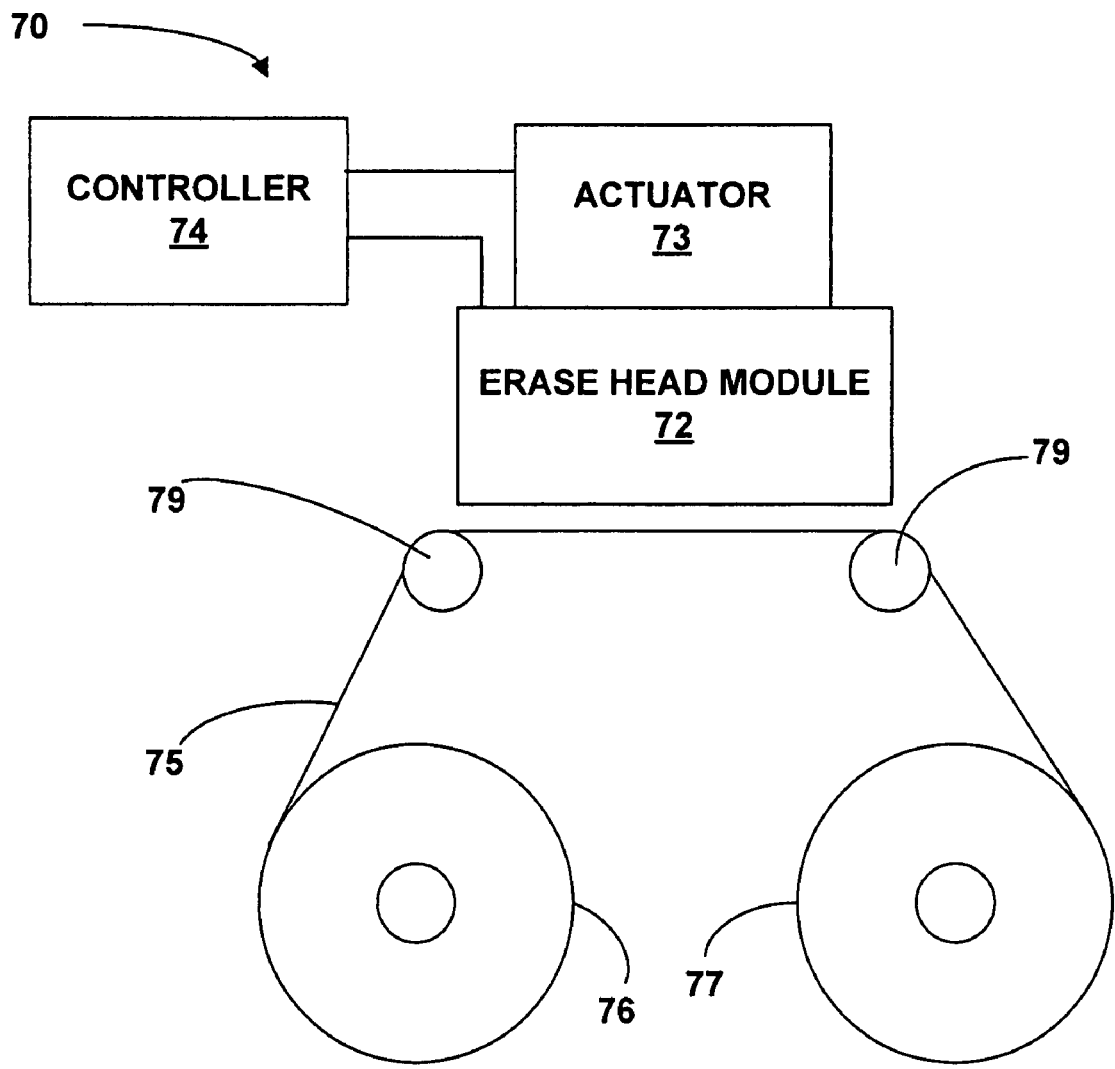
FIG. 1 is a conceptual diagram illustrating an exemplary tape recertification system that erases data tracks without erasing servo bands on a magnetic tape.

FIG. 1 is a conceptual diagram illustrating tape recertification system 70 that erases data tracks without erasing servo bands on magnetic tape 75. Tape recertification system 70 provides a means for erasing data tracks of data storage tapes in used data storage tape cartridges without erasing servo bands of the data storage tapes. Tape recertification system 70 may be used to erase data from data storage tapes without destroying servo bands on the data storage tapes, which allows the data storage tapes to be reused.

The data tracks are included in one or more data bands in magnetic tape 75. System 70 includes erase head module 72, actuator 73, controller 74, and magnetic tape 75 spooled on spools 76 and 77. System 70 also includes guides 79, which coarsely position magnetic tape 75 adjacent erase head module 72. In some embodiments, magnetic tape 75, spool 76 and spool 77 may be part of a tape cartridge. In other embodiments, magnetic tape 75 may be stored on a single spool, e.g., spool 76. In such embodiments, spool 77 may be a permanent component of tape recertification system 70.

Figure 2:
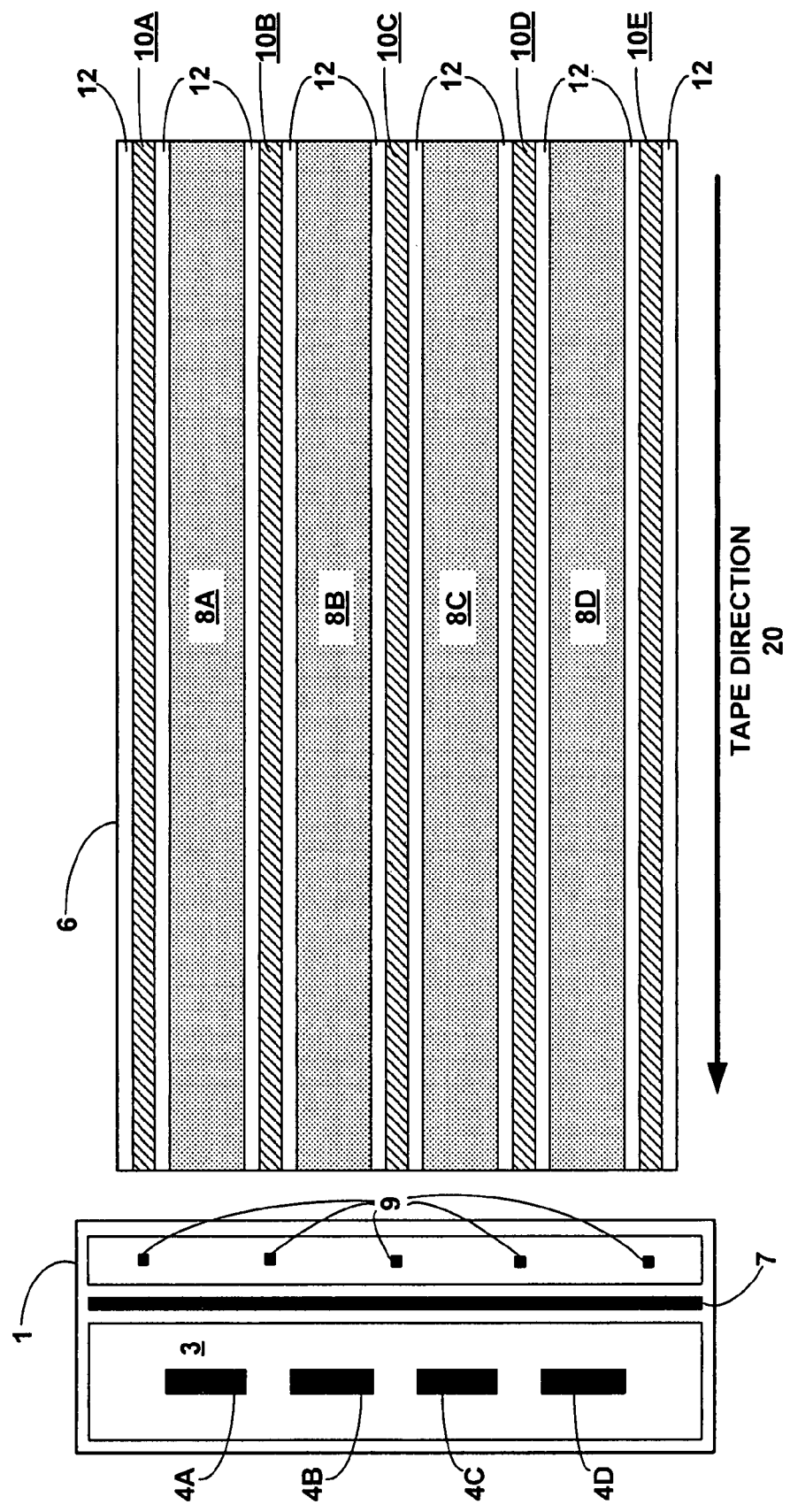
FIG. 2 is a conceptual illustration of an erase head module for a tape recertification system and a corresponding magnetic tape.

As shown in FIG. 2 with respect to erase head module 1, erase head module 72 contains a set of erase gaps configured to coincide with data bands of magnetic tape 75 to allow erasure of only the data bands of magnetic tape 75 while not erasing servo bands of magnetic tape 75. Erase head module 72 also includes one or more servo read elements located adjacent the set of erase gaps to detect one or more of the servo bands of the data storage tape when the set of erase gaps are proximate the data bands of the data storage tape to allow the erase head to accurately track the data bands with the set of erase gaps.

Magnetic tape 75 feeds from spool 76 to spool 77, passing in close proximity to erase head module 72. For example, magnetic tape 75 may be stored on a single spool and pulled into a tape recertification system for erasure. Magnetic tape 75 may contact the erase head of erase head module 72 during erasure of data bands. As magnetic tape 75 passes in close proximity to erase head module 72, controller 74 receives a signal from servo read elements in erase head module 72 derived from servo patterns in one or more servo bands on magnetic tape 75. Controller interprets the signals from erase head module 72 and provides a position error signal (PES) to actuator 73 to maintain the position of erase head module 72 relative to magnetic tape 75. Controller 74 also controls the magnetic fields applied by erase head module 72 to erase data bands of magnetic tape 75 while maintaining the position of erase head module 72 relative to magnetic tape 75.

Actuator 73 may be any actuator or combination of actuators suitable to position erase head module 72 precisely relative to magnetic tape 75. For example, actuator 73 may be a voice coil motor, a piezoelectric actuator, a stepper motor, other actuator or a combination thereof.

Tape recertification system 70 may also evaluate a signal quality derived from one or more of the servo bands of magnetic tape 75 to certifying magnetic tape 75 for reuse. For example, controller 74 may evaluate a position error signal (PES) derived from a servo read element signal of erase head module 72 reading a servo band of magnetic tape 75 to determine if magnetic tape 75 is suitable for reuse. For example, if magnetic tape 75 is physically damaged or a servo pattern is degraded, magnetic tape 75 may not reliably store data and magnetic tape 75 would not be suitable for reuse. In this manner, tape recertification system 70 provides a means for certifying magnetic tape 75 for reuse according to a signal quality derived from one or more of the servo bands of magnetic tape 75.

Controller 74 may report a result of the certification to a user. For example, in the event that a signal quality derived from one or more of the servo bands of magnetic tape 75 does not meet a predefined threshold, such as that magnetic tape 75 may not reliably store data, controller 74 may issue an audible or visual indication that magnetic tape 75 is not suitable for reuse. As another example, controller 74 may stop erasure of magnetic tape 75, e.g., if erase head module 72 gets too far off-track.

Magnetic tape 75 may be part of any type of tape cartridge that includes a rewriteable data storage tape with servo bands. For example, the tape cartridge may conform to any one of the following tape format standards: Linear Tape Open (LTO), T10,000, 9840, 9940, Scalable Linear Recording (SLR), 3592, 3590, 3570, or other tape format standard.

FIG. 2 is a conceptual illustration of erase head module 1 for a tape recertification system and magnetic tape 6. Magnetic tape 6 includes data bands 8A-8D (data bands 8) and servo bands 10A-10E (servo bands 10). Data bands 8 are separated from servo bands 10 by guard bands 12. Guard bands 12 do not contain recorded data or servo patterns.

Erase head module 1 includes erase gaps 4A-4D (erase gaps 4) formed in common magnetic layer 3 and servo read elements 9, which are located adjacent erase gaps 4 to coincide with servo bands 10. Erase head module 1 also includes conductive shield 7, which separates servo read elements 9 from common magnetic layer 3. Erase head module 1 includes a coil (not shown in FIG. 2) that applies an electrical signal to common magnetic layer 3 in order to generate magnetic fields across gaps 4 to erase data bands 8.

During erasure of magnetic tape 6, magnetic tape 6 moves in tape direction 20 relative to erase head module 1. Erase gaps 4 are configured to coincide with data bands 8 to allow erasure of only data bands 8 while not erasing servo bands 10. Servo read elements 9 detect servo bands 10 as magnetic tape 6 moves in tape direction 20 such that erase gaps 4 are proximate data bands 8. Servo read element 9 allow the erase head module 1 to accurately track data bands 8 with erase gaps 4.

A controller (not shown), which may be part of erase head module 1 but is generally located elsewhere, maintains the position of erase gaps 4 relative to data bands 8 using a signal from servo read element 9 as is detects servo band 10C. The controller ensures that only data bands 8 are erased and that servo bands 10 remain recorded on magnetic tape 6. In this manner, servo read element 9 allows the erase head module 1 to accurately track data bands 8 with erase gaps 4. Erase gaps 4 may be slightly larger than a width of data bands 8 such that the erase gaps 4 cover a portion of guard bands 12, which are adjacent data bands 8. For example, data bands 8 may each have widths of approximately 2667 µm, and erase gaps 4 may each be approximately 2707 µm wide, which would allow complete erasure of data bands 8 in the event of tracking position errors of up to plus or minus 20 µm.

Figure 3:
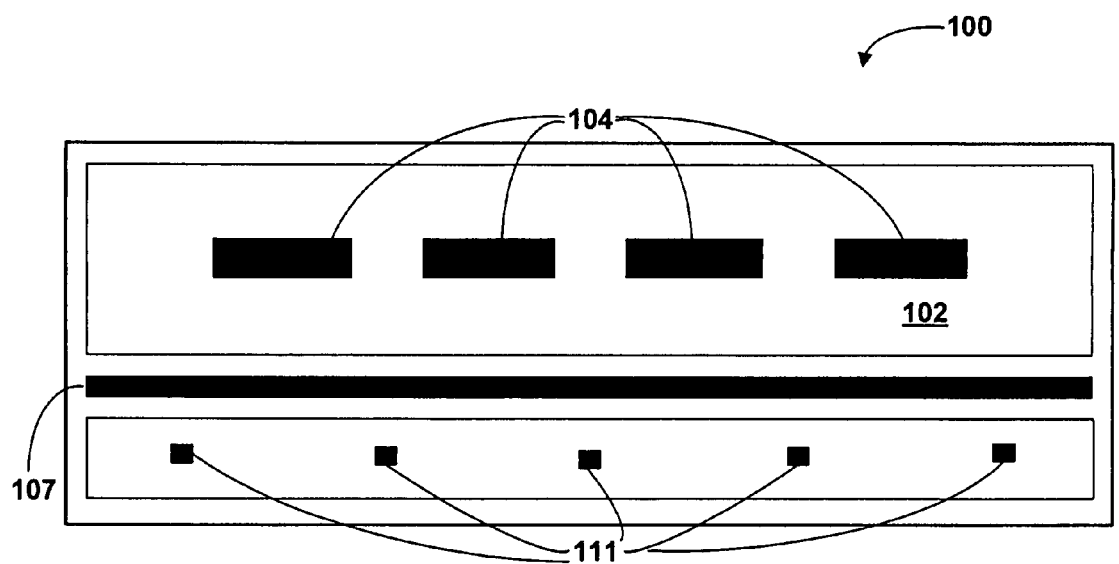
FIG. 3 is a conceptual illustration of an erase head module for a tape recertification system.

FIG. 3 is a conceptual illustration of erase head module 100 for a tape recertification system. Erase head module 100 includes erase gaps 104 formed in common magnetic layer 102, shield 107, and servo read elements 111. Erase head module 100 may be substantially similar to erase head module 72 of FIG. 1 and erase head module 1 of FIG. 2. Erase head module 100 is configured to erase data tracks without erasing servo bands on a data storage tape such as a magnetic tape.

A controller, such as controller 74 (FIG. 1), applies electrical signals to erase head module 100 via one or more coils to generate magnetic fields across gaps 104. For example, a direct current or an alternating current may be applied to erase head module 100 in order to generate magnetic fields across gaps 104. In some embodiments, both a direct current and an alternating current may be applied to erase head module 100 in successive passes of a data storage tape.

In operation, erase head module 100 generates continuous magnetic fields across erase gaps 104. With the magnetic tape moving relative to erase head module 100, erase head module 100 erases data stored in data bands of the magnetic tape while not erasing servo bands of the magnetic tape. A direct current signal or an alternating current applied to the one or more coils can be used to generate the magnetic fields across erase gaps 104. In either case, the magnetic field strengths from erase gaps 104 are strong enough to saturate the magnetic medium of data storage tape.

Figure 4:
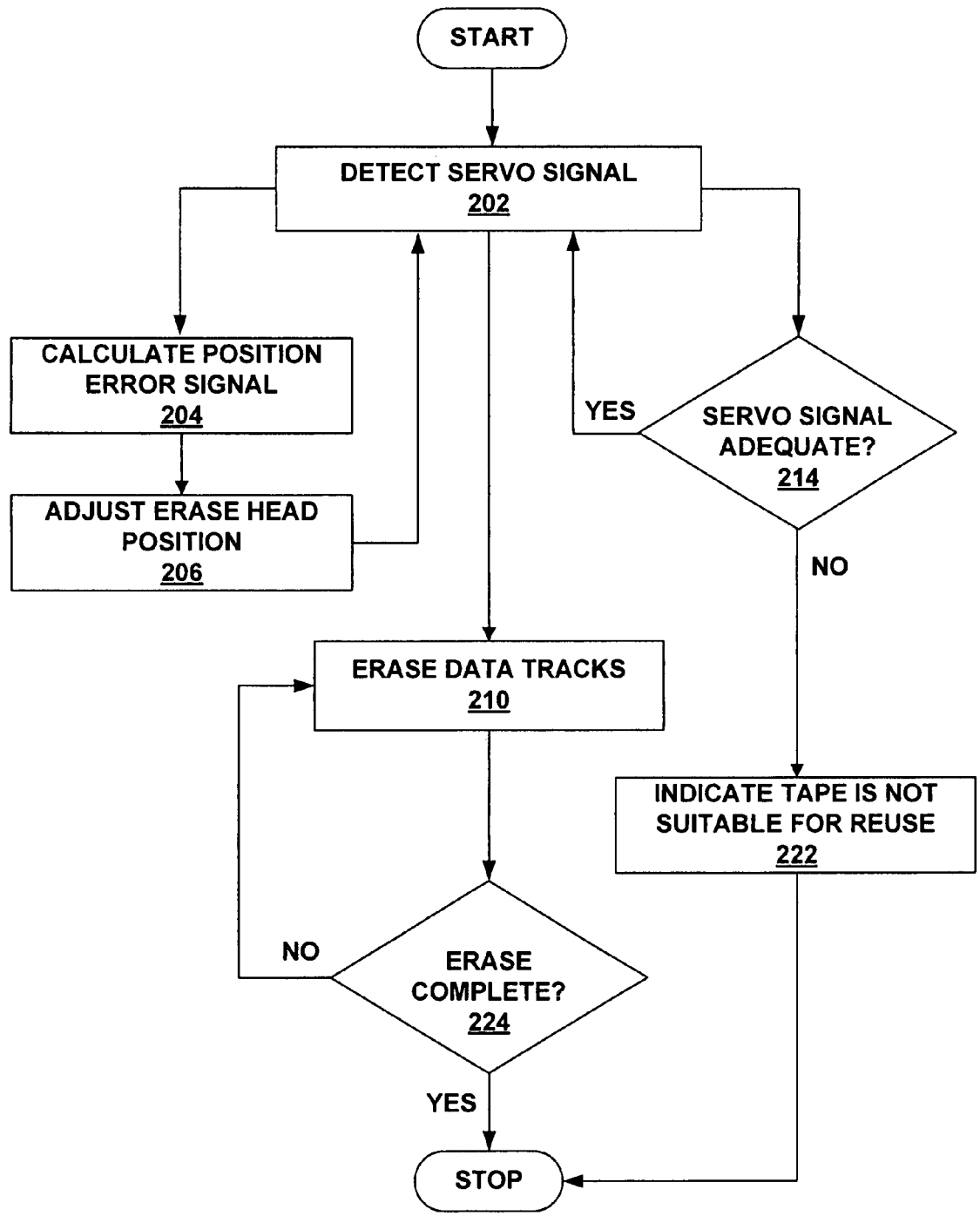
FIG. 4 is a flowchart illustrating exemplary techniques for data storage tape recertification.

FIG. 4 is a flowchart illustrating exemplary techniques for data storage media recertification. For clarity, the techniques shown in FIG. 4 are described with respect to tape recertification system 70 of FIG. 1. First, magnetic tape 75 is located in proximity to erase head module 72 and a servo read element detects servo patterns in one or more servo bands of magnetic tape 75 (202).

Controller 74 calculates a PES based on the detected servo patterns (204). Actuator 73 adjusts the position of erase gaps of erase head module 72 based on the PES from controller 74 (206). Steps 202, 204 and 206 are repeated in closed-loop fashion to maintain precise positioning of erase gaps of erase head module 72 relative to data bands of magnetic tape 75.

As erase gaps of erase head module 72 are held in position relative to data bands of magnetic tape 75, controller 74 creates a magnetic field across the erase gaps to erase data tracks of magnetic tape 75 while not erasing servo bands of magnetic tape 75 (210). The data tracks of magnetic tape 75 may be located in one or more data bands of magnetic tape 75. Step 210 is continued until erasure of the data tracks is complete (224). Optionally, tape recertification system 70 may repeat the erasure process in a reverse-tape direction. For example, in a first pass, system 70 may apply a direct-current signal to erase data on magnetic tape 75, and in a second pass, system 70 may apply an alternating-current signal to make it more difficult or impossible to recover the erased data. More than two passes using direct-current and/or alternating-current signals may also be used if desirable to ensure erased data is unrecoverable.

Controller 74 may also evaluate a signal quality derived from the one or more servo bands providing the servo signal in step 202 while erasing the data storage tape (214). The servo band may include any type of servo pattern, such as an amplitude-based servo pattern or a time-based servo pattern. Step 214 continues throughout the erasure of magnetic tape 75. For example, controller 74 may compare a signal quality derived from the servo band to a threshold level. If controller 74 determines that the signal quality derived from the servo band is below the threshold level, controller 74 may report to a user that magnetic tape 75 is not suitable for reuse (222). Controller 74 may also stop the erasure of the magnetic tape 75 after determining that the signal quality derived from the servo band is below the threshold level prior to completing erasure of magnetic tape 75. In other embodiments, controller 74 may continue the erasure of the magnetic tape 75 even if the signal quality derived from the servo band is below the threshold level. If controller 74 determines that the signal quality derived from the servo band meets or exceeds the threshold level, controller 74 may certify magnetic tape 75 for reuse. As one example, a threshold level may be a PES of no greater than 20 μm at any time during the erasure of magnetic tape 75. As another example, a threshold level may be a PES which exceeds the product specification for magnetic tape 75. If the erasure process is repeated for multiple cycles, controller 74 may also repeat the evaluation of the signal quality derived from the one or more servo bands providing the servo signal in step 202 while erasing the data storage tape for one or more of the cycles.

Optionally, once erasure of magnetic tape 75 is complete, or erasure of a portion of magnetic tape 75 is complete, controller 74 may attempt to read from the data tracks of magnetic tape 75 to verify erasure of data from the data tracks. For example, controller 74 may use a standard read head to attempt to read from the data tracks of magnetic tape 75. In other embodiments, a read element may be integrated as part of an erase head module to verify erasure of magnetic tape 75.

Various embodiments of the invention have been described. However, various modifications to the described embodiments can be made within the spirit of the invention. For example, the described embodiments generally relate to magnetic data storage tape, but the invention may also be applied to any rewriteable data storage tape that includes distinct servo bands. For example, the invention may also be applied to optical tape, holographic tape, or other linear media formats. These and other embodiments are within the scope of the following claims.

The invention claimed is:

1. An erase head module for erasing data storage tape that includes a plurality of data bands separated by servo bands, the erase head module comprising:
   a set of erase gaps, wherein the set of erase gaps is configured to coincide with the plurality of data bands of the data storage tape separated by the servo bands to allow erasure of only the data bands of the data storage tape while not erasing the servo bands of the data storage tape that separate the data bands;
   one or more servo read elements to detect at least one of the servo bands of the data storage tape that separate the data bands when the set of erase gaps are proximate to the data bands of the data storage tape to allow the erase head module to accurately track the data bands with the set of erase gaps; and
   a controller that determines signal quality associated with at least one of the servo bands while the set of erase gaps erase the data bands.

2. The erase head module of claim 1, further comprising a common magnetic layer, wherein the erase gaps are each formed in the common magnetic layer.

3. The erase head module of claim 2, further comprising a conductive shield that separates the one or more servo read elements from the magnetic layer.

4. The erase head module of claim 1, further comprising a coil that applies an electrical signal to generate magnetic fields across the set of erase gaps.

5. The erase head module of claim 4, wherein the electrical signal is an alternating current electrical signal.

6. The erase head module of claim 4, wherein the electrical signal is a direct current electrical signal.

7. The erase head module of claim 1, further comprising an actuator that precisely positions the erase head module relative to the data storage tape according to a signal derived from the servo bands detected by the one or more servo read elements.

8. The erase head module of claim 1, wherein the erase gaps are slightly larger than a width of the data bands such that the erase gaps cover a portion of guard bands adjacent to the data bands on the data storage tape.

9. The erase head module of claim 1, wherein the data storage tape is a magnetic data storage tape.

10. A method of erasing a data storage tape, the method comprising:
    positioning an erase head module adjacent the data storage tape, wherein the data storage tape includes a plurality of data bands separated by servo bands;

detecting a series of servo patterns in at least one of the servo bands of the data storage tape;

maintaining the position of the erase head module relative to the data storage tape with an actuator according to a signal derived from the detected series of servo patterns;

erasing the plurality of data bands of the data storage tape with the erase head module while not erasing servo bands of the data storage tape that separate plurality of data bands; and evaluating a signal quality derived from the servo bands while erasing the data storage tape.

11. The method of claim 10, further comprising:

determining that the signal quality derived from at least one of the servo bands is below a threshold level; and reporting to a user that the data storage tape is not suitable for reuse.

12. The method of claim 11, wherein the signal quality is not suitable because of at least one of a group consisting of:

the data storage tape is physically damaged; and at least some servo patterns of the series of servo patterns are magnetically degraded.

13. The method of claim 10, further comprising:

determining that the signal quality derived from at least one of the servo bands meets or exceeds a threshold level; and certifying the data storage tape for reuse.

14. The method of claim 10, wherein the erase head module includes:

a set of erase gaps, wherein the set of erase gaps is configured to coincide with the data bands of the data storage tape to allow erasure of only the data bands of the data storage tape while not erasing the servo bands of the data storage tape that separate the data bands; and one or more servo read elements located adjacent to the set of erase gaps to detect at least one of the servo bands of the data storage tape that separate the data bands when the set of erase gaps are proximate to the data bands of the data storage tape to allow the erase head module to accurately track the data bands with the set of erase gaps.

15. The method of claim 14, wherein the erase head module further includes:

a common magnetic layer, wherein the erase gaps are each formed in the common magnetic layer; and a conductive shield that separates the servo read element from the magnetic layer.

16. The method of claim 10, wherein the erase head module includes a set of erase gaps, the method further comprising generating magnetic fields across the set of erase gaps to erase the data bands of the data storage tape.

17. The method of claim 10, further comprising using tape guides to coarsely position the data storage tape relative to the erase head module.

18. A system for re-certifying used data storage tape cartridges comprising data storage tapes that each include a plurality of data bands separated by servo bands, the system comprising:

means for erasing the plurality of data bands of the data storage tapes in the used data storage tape cartridges without erasing the servo bands of the data storage tapes that separate the data bands; and means for certifying the data storage tapes for reuse according to a signal quality derived from at least one or more of the servo bands.

19. The system of claim 18, further comprising a controller that reports a result of the means for certifying the data storage tapes for reuse to a user.

20. An erase head module for erasing data storage tape comprising:

a set of erase gaps, wherein the set of erase gaps is configured to coincide with data bands of the data storage tape to allow erasure of only the data bands of the data storage tape while not erasing servo bands of the data storage tape; and one or more servo read elements to detect at least one of the servo bands of the data storage tape when the set of erase gaps are proximate to the data bands of the data storage tape to allow the erase head module to accurately track the data bands with the set of erase gaps, wherein the erase gaps are slightly larger than a width of the data bands such that the erase gaps cover a portion of guard bands adjacent to the data bands on the data storage tape.

* * * * *